(12) United States Patent
Van Aerle et al.

(10) Patent No.: US 8,508,835 B2
(45) Date of Patent: Aug. 13, 2013

(54) DISPLAY COMPRISING AN INCREASED INTER-PIXEL GAP

(75) Inventors: Nicolaas Aldegonda Jan Maria Van Aerle, Eindhoven (NL); Kevin Michael O'Neill, Eindhoven (NL); Petrus Johannes Gerardus Van Lieshout, Eindhoven (NL)

(73) Assignee: Creator Technology B.V., Breda (NL)

( * ) Notice: Subject to any disclaimer, the term of this patent is extended or adjusted under 35 U.S.C. 154(b) by 323 days.

(21) Appl. No.: 12/938,091

(22) Filed: Nov. 2, 2010

(65) Prior Publication Data

US 2012/0105939 A1   May 3, 2012

(51) Int. Cl.
*G02B 26/00* (2006.01)
*G09G 3/34* (2006.01)
*G02F 1/13* (2006.01)

(52) U.S. Cl.
USPC ............... 359/296; 345/84; 345/107; 349/2; 349/79; 349/84; 349/86; 349/139; 349/143

(58) Field of Classification Search
USPC ............... 359/296; 345/55, 84, 107; 349/2, 349/78, 84, 86, 139, 143
See application file for complete search history.

(56) References Cited

U.S. PATENT DOCUMENTS

2004/0252360 A1* 12/2004 Webber et al. ............... 359/296

FOREIGN PATENT DOCUMENTS

| JP | 2006-309038 | 11/2006 |
| JP | 2007-072016 | 3/2007 |

OTHER PUBLICATIONS

European Patent Office, International Search Report, International Application No. PCT/NL2011/050731, Apr. 12, 2012.

* cited by examiner

*Primary Examiner* — Evelyn A. Lester

(57) ABSTRACT

A display structure is described comprising a displaying medium, a backplane provided with an active matrix and a pixel pad comprising a plurality of pixels having an inter-pixel spacing, said pixel pad superposing the active matrix, wherein the inter-pixel spacing is in the range of 2.5-40 micrometers, preferably in the range of 8-20 micrometers.

12 Claims, 9 Drawing Sheets

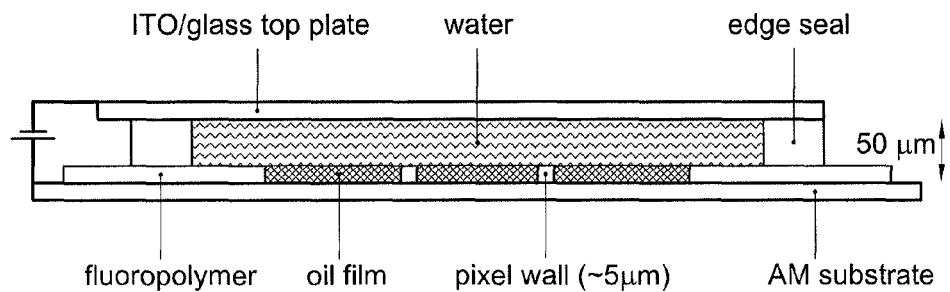
Fig. 2a
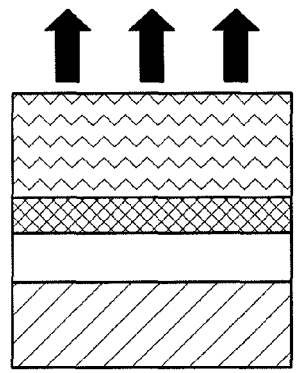
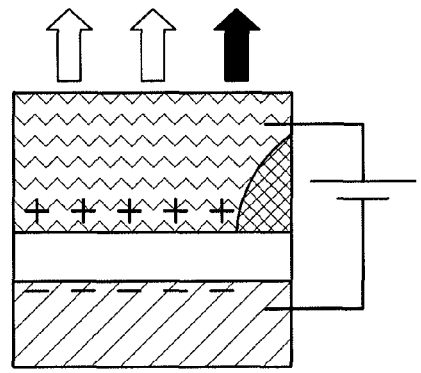
Fig. 2b          Fig. 2c
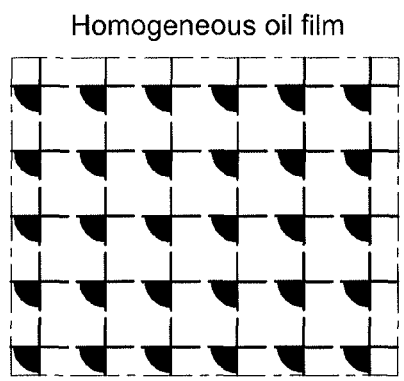
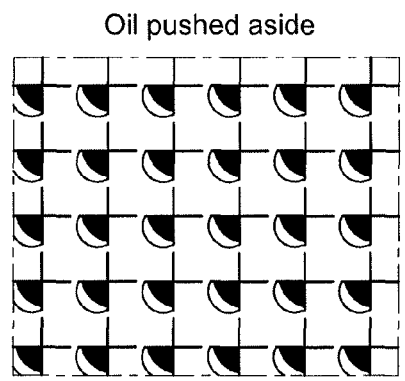
Fig. 2d          Fig. 2e

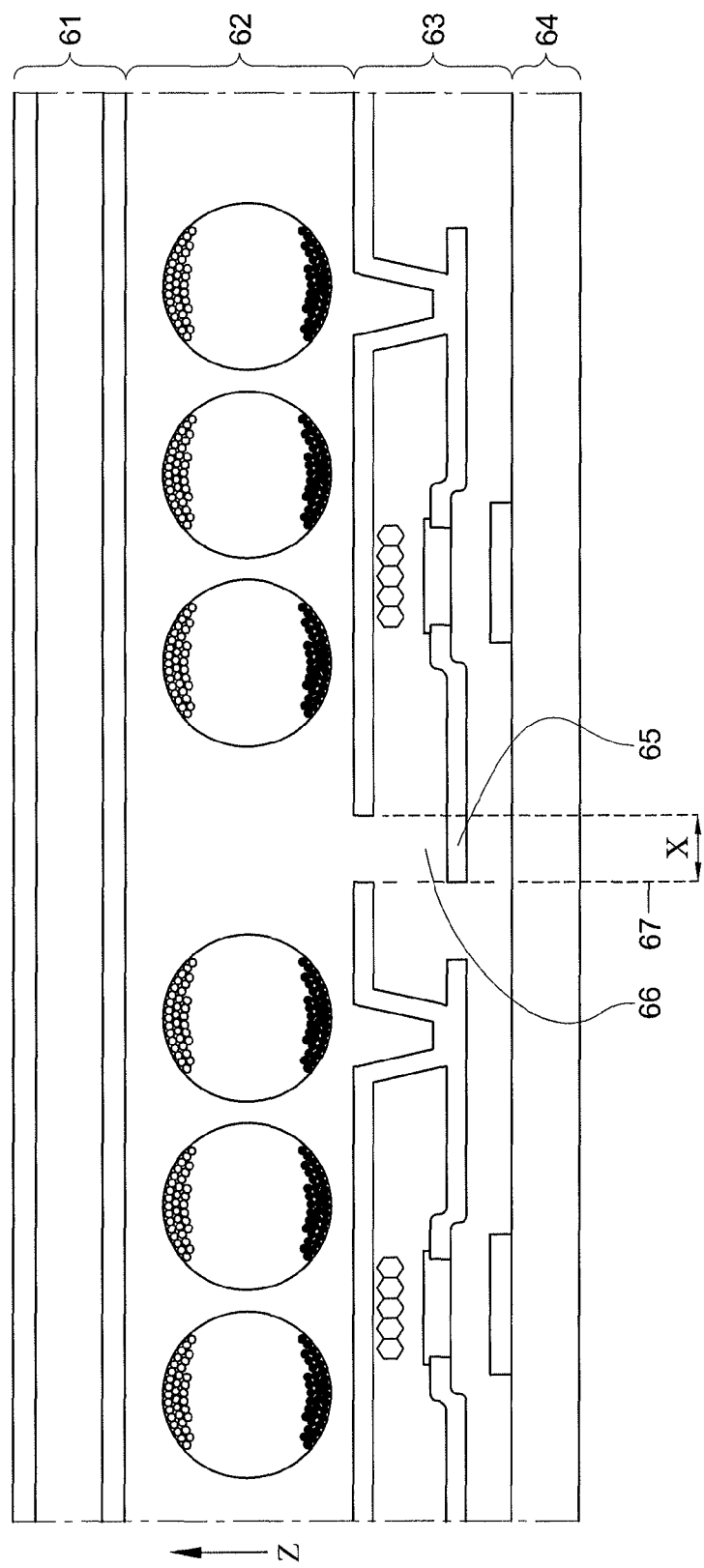

DISPLAY COMPRISING AN INCREASED INTER-PIXEL GAP

FIELD OF THE INVENTION

The invention relates to a display comprising a displaying medium, a backplane provided with an active matrix and a pixel pad comprising a plurality of pixels having an inter-pixel spacing, said pixel pad superposing the active matrix.

The invention further relates to a method of manufacturing a display.

The invention still further relates to an electronic apparatus.

BACKGROUND OF THE INVENTION

In recent years, there has been an increasing demand for thin display devices, particularly for mobile devices. As for mobile applications, low power consumption is highly preferred, and reflective display types using ambient light as a light source are being developed. Alternative display types, for example transmissive displays like liquid crystal displays (LCDs) needing a backlight or emissive displays like organic light emitting diode (OLED) displays, usually consume more power.

For example, an electrophoretic display may comprise a display medium part comprising a suitable stack of different layers, including a substrate carrier, an electrode layer and a display effect layer. An example of a suitable display effect layer relates to an electrophoretic display comprising a plurality of microcapsules filled with electrically charged pigment particles in a dyed suspension fluid, for example white titanium dioxide particles in a black dyed fluid. Another type of a suitable display effect layer relates to a plurality of microcapsules filled with two types of contrastingly colored and oppositely charged particles, for example white titanium dioxide particles and carbon black particles, provided in a substantially transparent suspension fluid. Still another example of a suitable display effect layer relates to a so-called Gyricon display comprising a plurality of bichromal spheres, comprising of two contrastingly colored and oppositely charged hemispheres. Still another example of a suitable display effect layer relates to a display material capable of operating using electrowetting.

SUMMARY OF THE INVENTION

In the discussed examples of the display effect layers the total thickness of the display effect layer may exceed 20 µm and may be close to 40-50 µm. It is found that such display effect layers may be sensitive to the polarity of the DC-electrical field applied to the display effect layer, as each pixel within the display array is driven between an "on" state and an "off" state by supplying a voltage difference between the pixel pad of the backplane and a further electrode (a counter electrode) of the displaying medium.

All pixel pads are separated from each other using an inter-pixel-gap. The pixel pads can cover over 95% of the total display area, covering the different layers stacked underneath. However, these layers may be manufactured in a process in which small defects may occur due to particles, impurities and other artifacts present in the process and/or the material used there for. These defects can lead to problems associated with broken conductive lines, undesirable conducting area or shorts through dielectric layers. All these problems may lead to defective pixels, resulting in a pixel unit or a series of pixel units which permanently dwell in an "on" or "off" status negatively influencing the overall quality of the display.

It will be appreciated that an embodiment wherein the pixel pad covers a substantial (over 95%) area of the total display area is usually referred-to as a field shielded design. Such design is known per se, in which the pixel pad is applied over the (almost) complete pixel area. The conventional design used in an LCD may not necessarily use this field shield, but instead the pixel pad may be made in the same layers as the TFT, thereby reducing the effective area of the pixel pad.

The field shielded design has a better optical performance, but may require additional processing steps during manufacturing. For the reflective display types discussed herein below the field shielded design may be an advantageous feature, as the fields generated by the pixel circuit can cause switching artifacts.

Embodiments of the invention provide a display wherein risk of short circuits is reduced. More in particular, embodiments of the invention provide a display having an improved yield and a reduced cross-talk between neighboring pixels.

To this end in the display according to embodiments of the invention the inter-pixel spacing is in the range of 20%-50% of a distance between a pixel electrode and a counter electrode used for controlling the pixel switching state. Preferably, the inter-pixel spacing is in the range of 8-20 µm and is smaller than a distance between a pixel electrode and a counter electrode used for controlling the pixel switching state.

Embodiments of the invention are preferably operable with the field shielded design, since in such a case, the pixel pad can be applied in a layer higher than the rest of the circuitry to provide the shielding function even when the distance between the pixel pads is increased or when the column electrodes (in a layer below) are positioned in between the pixel pads. It will be appreciated that the term "the higher layer" or "the lower layer" relates to a position of a layer in the layer stack as viewed in the cross-section; wherein the upper (top) layer is defined as a layer which is conceived to be viewed by the user.

It is found that for a display in which the distance between the pixel electrode and the counter electrode is large compared to the inter-pixel-gap distance between the neighboring pixel electrodes, lateral electrical fringe field lines may be able to switch the whole pixel area. For the displaying media described above (electrophoretic, electrowetting or 'Gyricon' bichromal spheres) the distance between the pixel electrode and the common electrode is around 40 µm.

Embodiments of the invention further relate to a method of manufacturing a display, as is set forth in the claims.

These and other aspects of the described embodiments of the invention will be discussed in more detail with reference to Figures. It will be appreciated that Figures are presented for explanatory purposes only and may not be used for limiting the scope of the appended claims. In the Figures, for convenience purposes, like reference numerals refer to like elements.

BRIEF DESCRIPTION OF THE FIGURES

FIG. 2 schematically depicts an embodiment of a display operating using electrowetting;

FIG. 6b schematically depicts a cross-section of the embodiment of a display depicted in FIG. 6a.

DETAILED DESCRIPTION

Figure 1:
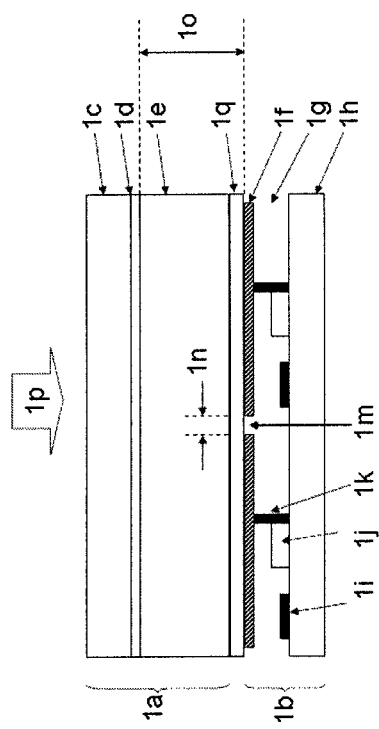
FIG. 1 schematically depicts an embodiment of a cross-section of a display comprising a display medium and a backplane.

FIG. 1 schematically depicts an embodiment of a cross-section of a display comprising a display medium and a backplane.

A display may comprise two main parts, a display medium part 1a and a backplane part 1b driving the display medium part 1a.

The display medium part 1a may comprise a stack of different layers, including a substrate carrier 1c, an electrode layer 1d and a display effect layer 1e. Various examples of display effect layers 1e are described elsewhere. For example, U.S. Pat. No. 6,683,333 B2 describes different types of electrophoretic display effect layers. One type comprises a plurality of microcapsules filled with electrically charged pigment particles in a dyed suspension fluid, for example white titanium dioxide particles in a black dyed fluid. When a direct current electric field is applied the particles move in a certain direction. Depending on the direction of the electric field, the particles move towards electrode layer 1d creating a white appearance to the viewer's side 1p or towards pixel pad if creating a black appearance as the dyed fluid becomes visible.

Another type of display effect layer consists of a plurality of microcapsules filled with two types of contrastingly colored and oppositely charged particles, e.g. white titanium dioxide particles and carbon black particles, in a substantially clear suspension fluid. When a direct current electric field is applied, one type of particles tends to move to one electrode 1d and the other type of particles to the opposite electrode 1f. Depending on the direction of the electric field, one or the other type of particles become visible to the viewer's side 1p.

Yet another type of display effect, the so-called Gyricon display of Xerox, see for example U.S. Pat. No. 5,808,783, comprises of a plurality of bichromal spheres, typically consisting of two contrastingly colored and oppositely charged hemispheres. Upon application of a DC field across the spheres through the electrodes 1d and 1f, the spheres rotate, and one of the two colors become visible to the viewer's side 1p. Apart from electrophoretic display effects, another effect is contemplated, referred to as so-called 'electro-wetting' [R. van Dijk et al., SID 06 DIGEST pp 1926-1929; R. A. Hayes & B. J. Feenstra, Nature 425, 383 (2003)].

The backplane part 1b comprises a substrate 1h on top of which electronics are placed to define the matrix array of pixels. The electronics include electrodes defining the data lines 1i (also referred to as column or source lines), gate lines (not shown), switching elements like thin film transistors (TFTs) 1j and pixel pads if which are connected to the switching elements 1j via contacts 1k. The pixel pads are separated from the conducting parts underneath via an insulating layer 1g. Often storage capacitors are also implemented in the backplane underneath the pixel pads. More details are explained using FIG. 3 described herein below.

FIG. 2 (parts a-e) schematically depicts an embodiment of a display operating using electrowetting. In FIG. 2a a cross section of the stack is shown, comprising a reflective bottom electrode, which can be referred to as the pixel pad if in FIG. 1, a hydrophobic insulator, a colored oil layer, clear water and a top electrode and top substrate. The distance between bottom and top electrode layer is approximately 50 μm. FIG. 2b shows a close up of the active layers. In equilibrium the oil forms a stable continuous film between the water and the hydrophobic insulator layers. Upon application of a voltage electrostatic forces attract the water to the hydrophobic insulator, displacing the oil to a corner of each pixel, thus exposing the underlying reflecting electrode surface. FIG. 2d schematically depicts a pixel in a closed state with a film of oil spread out over the surface of the pixel. FIG. 2e shows schematically a pixel having a voltage applied to it, wherein the oil is displaced to a corner area of the pixel.

Figure 3:
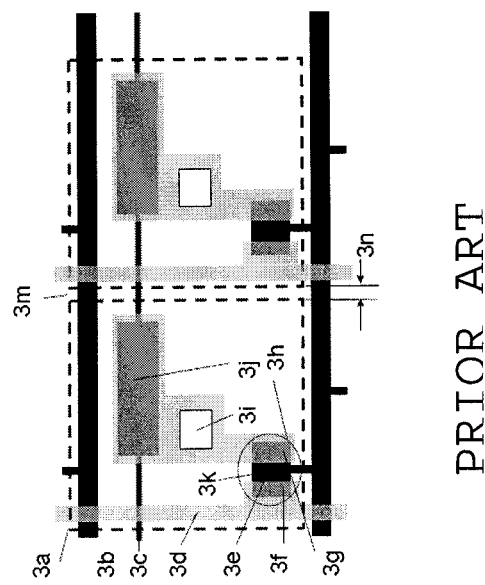
FIG. 3 schematically depicts an embodiment of a prior art display.

FIG. 3 schematically depicts an embodiment of a prior art display. FIG. 3 shows a schematic top view of two neighboring pixel or dot elements of a display, based on a so-called bottom-gate TFT. This structure is built up starting with a substrate that is provided with a first conducting layer. The first conducting layer is patterned to define the gate line 3b, the gate electrode 3e of the TFT switch '3h' and one electrode of the storage capacitor 3j as well as the storage capacitor line 3c. In this example the storage capacitor is provided with a separate storage capacitor line 3c. In general the storage capacitor line 3c is connected to the counter electrode of the display effect part (not shown). Alternatively, it is possible to have the storage capacitor connected to the gate line 3b. The first electrically conducting layer is covered by a non-conducting layer that acts as an insulating layer as well as a dielectric layer. In the outer boundary of the display this non-conducting layer is provided with holes or vias to enable electrical contacting of the gate lines (not shown). A second electrically conducting layer is provided and patterned to define the data line 3d (also referred to as column line or source line), the source electrode '3f', drain electrode 3g and channel 3k of the TFT, the contact area to the pixel pad 3i, and the second electrode of the storage capacitor 3j. To create a functional TFT a semiconductor layer is also provided either before or after application of the second electrically conducting layer (not shown in FIG. 3). This semiconductor layer can be further covered with a passivation layer to protect the semiconductor layer. Other build-ups, like top-gate TFTs are possible. The second electrically conducting layer is covered by a second insulating or dielectric layer in which only a hole is made in the area on top of part of the drain 3i to enable contacting a third electrically conducting layer and holes are made outside the display area (not shown) to enable contacting the gate and data lines. The third electrically conducting layer defines the pixel pad 3a (or if in FIG. 1) and is contacted to the drain of the TFT via the contacting hole 3i. All pixel pads 3a are separated from each other via an inter-pixel-gap 3m. The distance between two pixel pads is indicated as 3n in FIG. 3.

The pixel pads can cover over 95% of the total display area, covering the different layers underneath. The different layers are manufactured in a process in which small defects can occur due to particles, impurities or other artifacts in the process and materials used. These defects can lead to issues like broken conducting lines, unwanted conducting areas or unwanted short circuits through dielectric layers. All these issues can lead to defective pixels, resulting in a pixel unit or a series of pixel units to be continuously "on", "off" or in an undefined state.

One type of defect that can occur is caused by a short circuit of neighboring pixel pads via the inter-pixel-gap 1m in FIG. 1 or 3m in FIG. 3. This type of defect can lead to yield loss or to the need for costly repair steps. Another important type of defect that can occur is related to short circuit of the data line 3d with the overlapping pixel pad 3a. It is beneficial to create a design in which the risk of short circuiting is reduced.

Ideally, in displays the brightness or reflectance of a given pixel is controlled only by the data in the input signal intended for that pixel. Crosstalk is a disadvantageous visible artifact where the brightness or reflectance of a pixel is affected by the data information intended for other pixels in the display, i.e. voltages applied to the other pixels. In case of vertical crosstalk (VXT) the data signals associated with pixels above and/or below a given pixel cause unwanted changes in brightness or reflectance of the pixel. The visible effect of VXT is most obvious to a viewer in images where there is a fairly uniform background with a significant area of different brightness or reflectance present.

Figure 4:
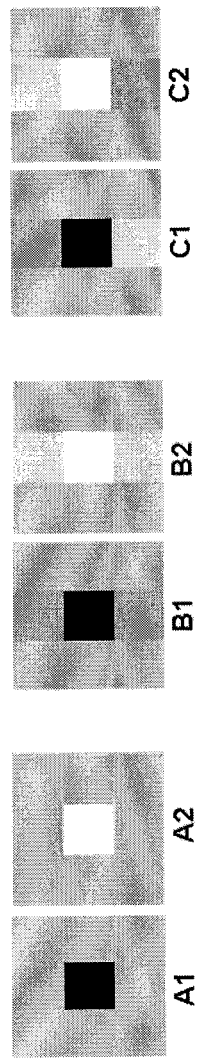
FIG. 4 schematically depicts examples of vertical crosstalk between neighboring pixels.

FIG. 4 schematically depicts examples of vertical crosstalk between neighboring pixels. FIGS. 4 A1 and A2 show two ideal images without VXT: a uniform grey area with a central region being black or white. FIGS. 4 B1 and B2 as well as FIG. 4 C1 and C2 show the images with VXT: extra bands above and below the central black or white area become visible. Depending on the driving conditions, situation B or C can occur. For example, in displays where an electrophoretic or electrowetting display medium is used, the situation shown in FIGS. 4 B1 and B2 could occur. In the case of LCDs using field inversion drive scheme, images as shown in FIG. 4 C1 and C2 can occur.

Ideally when a pixel TFT is off, the pixel is completely isolated from the data line so that none of the signals appearing on the data line in the 'off' period has any effect on the pixel voltage. VXT occurs when the isolation is reduced so that the data signal is coupled onto the pixel during the period when the TFT is off, thereby influencing the pixel voltage. Two major factors can give rise to this unwanted coupling; either a high leakage current through the TFT during the 'off' period or stray capacitance between the data line and the pixel pad.

Figure 5:
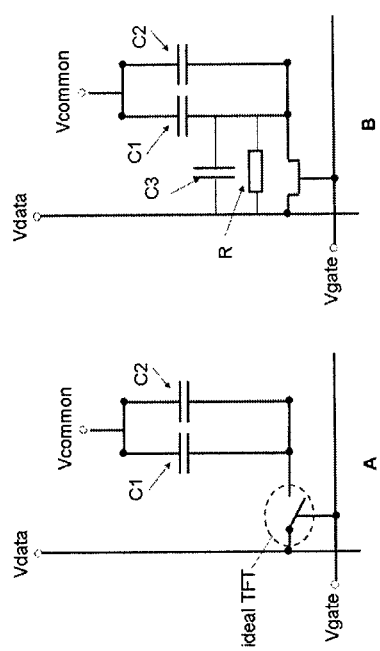
FIG. 5 schematically depicts an embodiment of an electrical circuit for driving the active matrix display.

FIG. 5 schematically depicts an embodiment of an electrical circuit for driving the active matrix display for an ideal case (A) and an actual pixel (B). In the ideal case (A) the TFT is an 'ideal TFT' acting as an ideal switch that is opened in the 'off' period and closed in the 'on' period or pixel charging period. Three capacitances strongly affect the occurrence of VXT: C1 is the capacitance of the display effect 1e (plus the adhesive layer 1q in the case of electrophoretic display media) being created between the pixel pad electrode if and the counter electrode 1d (in FIG. 1); C2 refers to the storage capacitor 3j in FIG. 3; C3 refers to the (stray) capacitance between the pixel pad if and the data line 1i (FIG. 1); R indicates the resistance of the TFT in the 'off' state.

For typical pixel geometries and related capacitances, VXT is significant and will lead to visible artifacts in grayscale images. This is a known problem in LCD design. Several possibilities exist to reduce VXT in LCDs, some of which may be practical.

It is possible to increase the pixel capacitance so the contribution of the unwanted capacitance between data line and pixel pad is reduced. This may be done by increasing the storage capacitor C2 in FIG. 5, such that it becomes dominant with respect to stray capacitance. However, increasing the storage capacitor can have an adverse effect on manufacturing yield.

In an embodiment known from U.S. Pat. No. 4,845,482 compensating signals may be applied to the gate. However, this will shorten the line time to address each row, thus requiring a higher quality TFT switch as well as lower resistivity of the gate lines. In addition a more complex gate driver is needed.

In another embodiment, known from U.S. Pat. No. 5,841,411 a data signal adjustment circuit is applied to adjust the data signals before application to the data lines. The adjustment circuit is arranged to derive the crosstalk compensation value for a pixel from the data line signals intended to be applied in the frame time period (also known as the 'non-select period') until that pixel is selected the next frame time. This solution requires complex data signal adjustment circuitry.

Figure 6A:
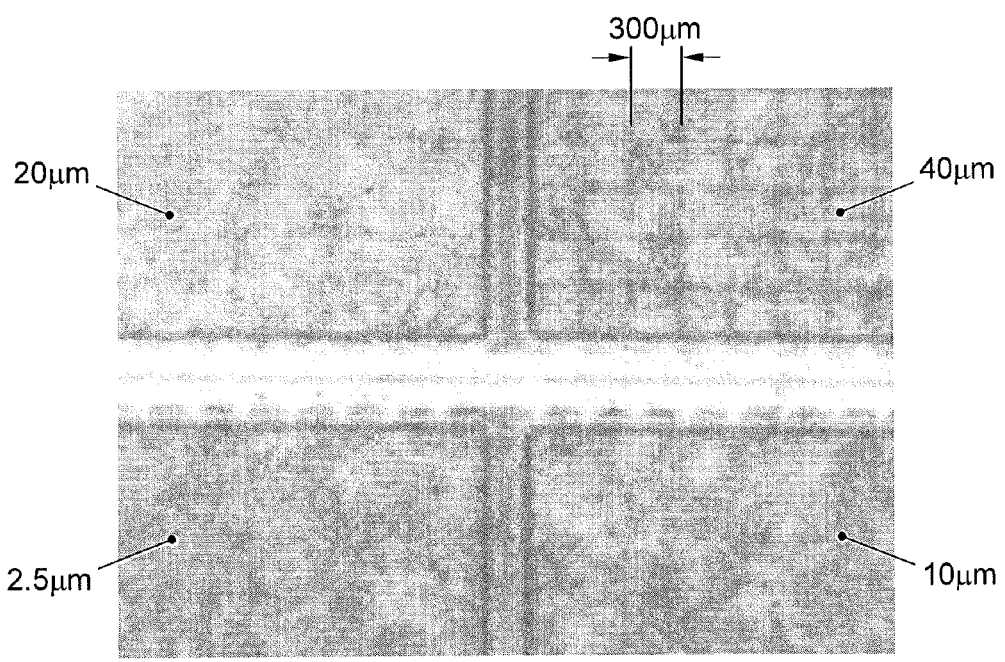
FIG. 6a depicts examples of inter-pixel gaps.

FIG. 6a depicts embodiments of the inter-pixel gaps according to embodiments of the invention. In accordance with an aspect of embodiments of the invention the inter-pixel spacing is smaller than a distance between a pixel electrode and a counter electrode used for controlling the pixel switching state, and the inter-pixel spacing is, for example, preferably in the range of 8-20 μm. FIG. 6a shows a microscopic image taken during a transition of switching a uniform black picture to a uniform white picture. In the case of 40 μm spacing (upper right) the inter-pixel-gap grid is clearly visible. When the width of the inter-pixel-gap is 2.5, 10, or 20 μm, the inter-pixel-gap is only faintly noticeable. The used E Ink display effect layer 1e and adhesive 1q add up to a thickness 1o of close to 40 μm (see FIG. 1). Hence, it can be concluded that for displays having an overall thickness 2α for 1o, referring to the distance between the pixel pad electrode of the backplane and the counter electrode of the display medium, a maximum inter-pixel-gap of α for 1n can be applied without observing deterioration of the optical performance of the display. Hence, for pixels of width W and length L, the pixel pad can be reduced to W−α and L−α while maintaining maximum optical aperture. This can be applied as a so-called design rule.

This design rule can also be used to reduce VXT, i.e., to reduce the capacitance between the data line and the pixel pad electrode.

In the present embodiment the inter-pixel-gap is maximized without affecting the optical performance. In this way the overlapping area between the data line and the pixel pad is reduced, thus reducing the risk of short circuiting between the data line and the overlapping pixel pad. Hence the production yield is improved. In addition the risk of lateral short circuiting between neighboring pixel pads is reduced. By reducing the overlapping area between the data line and the pixel pad, the capacitance C3, shown in FIG. 5 is also reduced, leading to a reduction of VXT.

FIG. 6b schematically depicts a cross-section of the embodiment of a display depicted in FIG. 6a. In the view shown in FIG. 6b a layered structure of the electronic circuit according to an embodiment of the invention is shown. It will be appreciated that the stack of the depicted layers represents their consecutive sequence in space, i.e. along a vertical axis z. It is seen that a column electrode 65 is positioned beneath a field shield electrode 66 in an inter pixel spacing area 67. However, it will be appreciated that other layers provided between the depicted layers may be possible. Accordingly, a plastic substrate 64 having, for example 25 micron thickness may be provided. The substrate 64 may comprise or be composed of Teonex PEN material. An organic electronics backplane 63 is provided on the substrate 64, comprising row and column layers, as well as pixel electrodes. The organic electronic backplane layer 63 may be 5 microns thick. An electronic display layer 62 is superposed on the organic electronic backplane layer 63. The thickness of the electronic display layer 62 is about 40 micrometers. Finally, an upper layer 61 is provided comprising plastic substrate, such as anti-glare material as well as a common electrode layer. The total thickness of the upper layer 61 may be about 30 micrometers. The total thickness of the electronic circuit according to the invention may be about 0.1 mm, whereas the inter pixel distance x may be in the range of 2.5-40 micrometers, preferably in the range of 8-20 micrometers. The inter pixel distance is preferably smaller than a distance between a pixel electrode and a counter electrode used for controlling the pixel switching state. In accordance with an aspect of the invention the inter pixel distance may be about 20-50% of a distance between a pixel electrode and a counter electrode used for controlling the pixel switching state.

Figure 7:
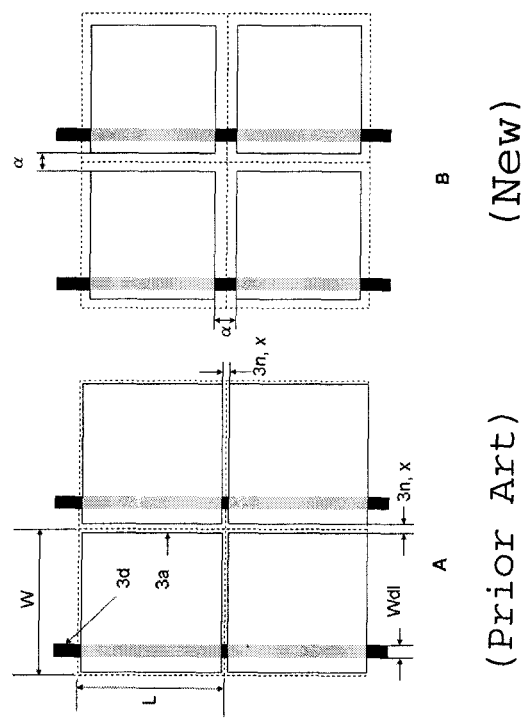
FIG. 7 schematically depicts a simplified embodiment of a inter-pixel gap according to the invention.

FIG. 7 schematically depicts a simplified embodiment of an inter-pixel gap according to the invention. FIG. 7A refers to the prior art design. It shows 4 pixels with a pixel width 'W' and length L. The actual pixel pad electrode is indicated by 3a and the data line by 3d. The data line width is Wdl and the inter-pixel-gap 3n is x. Hence the actual pixel pad dimensions become [W−x] and [L−x]. The overlapping area between the data line and the pixel pad is [Wdl*(L−x)].

FIG. 7B refers to an embodiment of the display according to the invention in which the inter-pixel-gap is maximized to a width of α, α preferably falling in the range of 8-20 μm. The total overlapping area is reduced by [Wdl*(α−x)].

As is seen from FIG. 7B, for the selected values of α the cross talk between the neighboring pixels is substantially reduced without mitigating the optical characteristics of the display.

Figure 8:
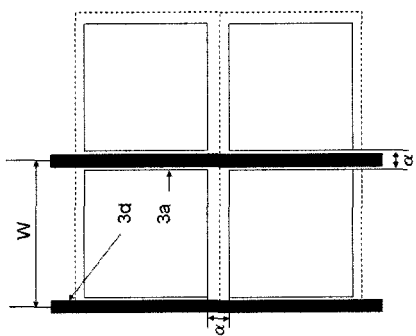
FIG. 8 schematically depicts an embodiment of a display according to the invention wherein the data line is provided in the area of the inter-pixel spacing.

FIG. 8 schematically depicts an embodiment of a display according to the invention wherein the data line is provided in the area of the maximized inter-pixel spacing, according to FIG. 7. This is found to be possible for displays in which the data line is provided in a lower layer than the pixel pad in the display and is not visible to the human eye. Such embodiment may be implemented in an electrophoretic display, for example. The total overlapping area between the data line and the pixel pad is strongly reduced, thus i) reducing the risk of short circuit between both electrodes and ii) reducing the stray capacitance C3 (shown in FIG. 5) and hence reducing VXT.

Accordingly, it is found that, in particular, by combining an increased inter-pixel gap according to embodiments of the invention with positioning the data line in the area of the inter-pixel gap, the risk of yield loss caused by short-circuiting of neighboring pixels or by short-circuiting data lines with overlapping pixel pads is minimized, and also the level of vertical crosstalk (VXT) is minimized.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. A display comprising:
a displaying medium;
a backplane provided with an active matrix;
a pixel pad comprising a plurality of pixels having an inter-pixel spacing, said pixel pad superposing the active matrix; and
a data line disposed on a lower layer between the pixel pad and the active matrix, and provided in a region corresponding to the inter-pixel spacing, wherein the inter-pixel spacing is in the range of 8-40 micrometers.

2. The display according to claim 1, wherein the inter-pixel spacing is in the range of 8-20 micrometers.

3. The display according to claim 2, wherein the inter-pixel spacing is 20-50% of a distance between a pixel electrode and a counter electrode.

4. The display according to claim 1, wherein the inter-pixel spacing is smaller than a distance between a pixel electrode and a counter electrode used for controlling the pixel switching state.

5. The display according to claim 1, wherein the display medium comprises an electrophoretic display effect layer.

6. The display according to claim 5, wherein the electrophoretic display effect layer comprises a plurality of capsules provided with a colored medium, or a plurality of capsules provided with at least two contrastingly colored substances.

7. The display according to claim 1, wherein the display medium is operable using electrowetting.

8. A display comprising:
a displaying medium;
a backplane provided with an active matrix;
a pixel pad comprising a plurality of pixels having an inter-pixel spacing, said pixel pad superposing the active matrix; and
a data line disposed on a lower layer between the pixel pad and the active matrix and provided in a region corresponding to the inter-pixel spacing, wherein the width of the inter-pixel spacing is equal or more than 20% of a distance between a pixel electrode and a counter electrode used for controlling the pixel switching state and less than 40 micrometers.

9. The display according to claim 8, wherein the width of the inter-pixel spacing is in the range of 2.5-40 um.

10. A method of manufacturing a display comprising a displaying medium, a backplane provided with an active matrix, a pixel pad comprising a plurality of pixels having an inter-pixel spacing, and a data line disposed on a lower layer between the pixel pad and the active matrix and provided in a region corresponding to the inter-pixel spacing, the method comprising the steps of:
providing a pixel pad superposing the active matrix, wherein the inter-pixel spacing is in the range of 2.5-40 micrometers; and
providing a data line on a lower layer between the pixel pad and the active matrix in a region corresponding to the inter-pixel spacing.

11. The method according to claim 10, wherein the inter-pixel spacing is smaller than a distance between a pixel electrode and a counter electrode used for controlling the pixel switching state.

12. The method of claim 10, wherein the inter-pixel spacing is in the range of 8-20 micrometers.

* * * * *